Nov. 25, 1958      E. T. WYMAN      2,861,619
TUBELESS TIRE WITH SAFETY INNER TIRE

Filed Jan. 25, 1954      3 Sheets-Sheet 1

*INVENTOR.*
EDWIN T. WYMAN

Nov. 25, 1958 E. T. WYMAN 2,861,619
TUBELESS TIRE WITH SAFETY INNER TIRE
Filed Jan. 25, 1954 3 Sheets-Sheet 2

INVENTOR.
EDWIN T. WYMAN

Nov. 25, 1958   E. T. WYMAN   2,861,619
TUBELESS TIRE WITH SAFETY INNER TIRE
Filed Jan. 25, 1954   3 Sheets-Sheet 3

INVENTOR
EDWIN T. WYMAN
BY
ATTORNEY

United States Patent Office 2,861,619
Patented Nov. 25, 1958

2,861,619

TUBELESS TIRE WITH SAFETY INNER TIRE

Edwin T. Wyman, Brookline, Mass.

Application January 25, 1954, Serial No. 405,819

4 Claims. (Cl. 152—340)

This invention relates to a tubeless tire with a safety inner tire and has for its object to provide a tubeless tire which includes in the combination the standard tire or casing now commercially available (but eliminating the inner tube now used therein), and which tubeless tire can be mounted on the standard drop-center rims now used on automobiles, and a separate safety inner tire to support the vehicle in the even that the tubeless tire itself is punctured or otherwise loses its air. This tubeless tire may also be used on other types of rims found on automobiles, busses, trucks, airplanes, motorcycles and bicycles. This is a continuation in part of U. S. Patent application Serial No. 141,501, Filed January 31, 1950 now U. S. Patent No. 2,675,846.

In my tubeless safety tire, no inner tube is used whatever, and the inner chamber of the tire casing forms the inflated chamber which supports the vehicle. The safety inner tire, which fills only a portion of the inner chamber of the tire casing, is separately inflated, and supports the vehicle only in the exceptional and emergency situation when the tubeless tire casing itself has lost its air due to puncture, blow-out or other cause. For that reason my tire is preferably termed a tubeless tire, despite the inclusion of the safety inner tire therein, which, however, is not normally called upon to support the vehicle. However, should a blow-out occur in the tubeless tire casing, the safety inner tire will not only hold the blown out tire casing on the wheel rim but will support the load of the vehicle indefinitely.

Briefly, my invention includes in combination the standard tire or casing now commercially available and having beaded edges, and designed to be mounted on the standard drop-center rim, or other rims having angular recesses at the sides. Preferably, also, the tire casing is provided on the inside thereof and underneath the tread surface with a thick coating of soft rubber sealing compound of a suitable nature, whereby punctures or holes caused by objects piercing the tread of the tire are readily sealed by the soft plastic compound, to prevent leakage of air through the tread. There is further provided a separate safety tire to be mounted within the tire casing, and substantially smaller in cross-section than the interior chamber of the tire casing. The tire casing and safety tire are separately inflated and are not in air communication with each other. To avoid the use of specially made valves, the casing and safety tube are preferably inflated through separate valves, but it will be understood that a single valve of dual or branching construction may be used to inflate the casing and safety tube separately, or simultaneously. The single valve structure in my U. S. Patent No. 2,608,235, issued August 26, 1952 may be used.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Figure 1:
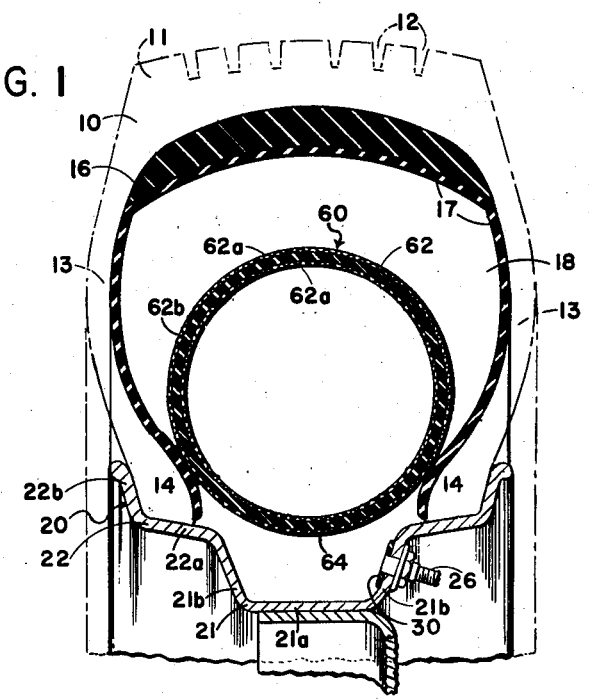
Figs. 1 and 2 are cross-sections of my tubeless tire as mounted on a wheel rim of the drop-center type and showing one way in which two valves may be used for inflating the tire and safety tire separately.

In the drawings 10 represents a standard rubber tire casing having a tread portion 11 with grooves 12 formed in the tread portion, and having side walls 13 and beaded edges 14. It will be understood that the beaded edge 14 is usually stiffened and strengthened with annular wire strands (not shown) which run around the tire inside the beaded edge 14. A lining or thick coating 16 of a self-sealing compound of any suitable nature is provided on the interior of the tire 10 beneath its tread surface which is designed to seal punctures and holes caused by nails and other objects piercing the tread surface. A rubber lining 17 is preferably provided on the interior of the tire and either under or over the coating 16 to prevent diffusion of air into the walls of the tire and possible separation of the fabric cords therein from the surrounding rubber material.

The standard tire casing 10 thus described is adapted to be mounted on a standard wheel rim 20, which, as shown in the drawings (Figs. 1, 2 and 4), is of the standard "drop-center" type having the drop-center portion 21 comprising the bottom wall 21a and side walls 21b, and angular recesses 22 at the sides thereof consisting of bottom wall 22a and side wall 22b, into which the angular outer surfaces of the beaded edges 14 of the tire 10 are designed to fit.

A tire valve 26 of standard construction is provided, preferably in the outer side wall 21b of the rim 20, through which the tire may be inflated. The tire valve shown in Fig. 1 is of the clamp-in type with suitable rubber washers 30 to prevent leakage of air around the valve 26.

A safety tire 60 of rubber, and fabric entirely separate from tire casing 10 is provided, to be mounted and inserted within the tire casing 10. In the safety tire construction shown in Figs. 1, 2, 3, 4, 5, 6 and 7 tires 60, 70 and 80 are formed of a relatively non-extensible material comprising the outer wall 62, relatively inextensible in nature and formed of two or more layers of a filamentary material such as cord or woven fabric 62a and one or more layers of rubber 62b suitably assembled. As shown in Fig. 1, it will be noted that the bottom wall 64 is not expanded on inflation to engage the inner drop-center portion of the rim 20, but will press firmly against the inner beads 14 holding the tire beads 14 firmly in place. A separate valve 46 is provided through which the safety tire 60 may be inflated, which again is provided with suitable washers 30 to prevent leakage of air around the valve, and a flexible neck 47 extending to the inner tire 60. It will be understood that there is no communication by air between safety tire 60 and the inflated interior chamber 18 of the tire casing 10, and that in the event of deflation of tire casing 10, by puncture, blow-out or otherwise, that the inflated safety tire 60 will provide sufficient support for the vehicle to permit the driver to retain control of his vehicle and eliminate such hazards as skidding and inability to steer properly, which are particularly dangerous if the vehicle is traveling at high speed. The safety tire 60 acts to hold the beads 14 of the deflated tire casing 10 in place in the flanged recesses 22 of the wheel rim 20 and supports the load of the vehicle indefinitely.

Figure 2:
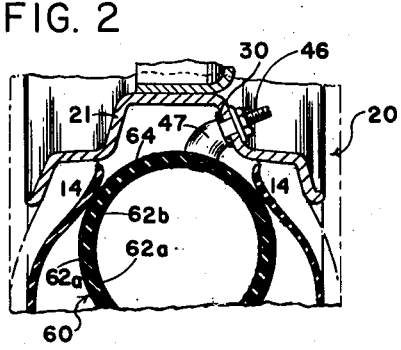
Figure 3:
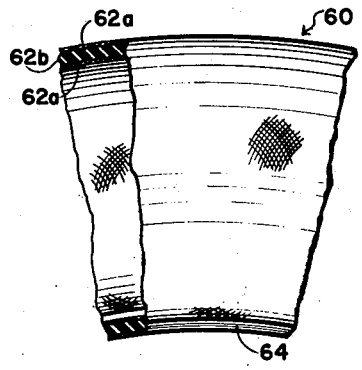
Fig. 3 is a side elevation of a portion of the safety tire shown in Figs. 1 and 2 with a portion broken away to show the construction of the safety tire.
Figure 4:
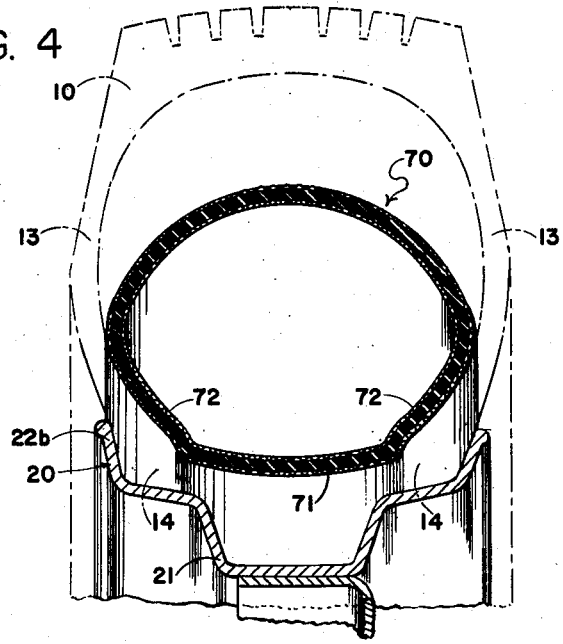
Fig. 4 is a cross-section of a tubeless tire having a modified form of safety tire.

In Fig. 4 I have shown a second modified form of safety tire 70, in which the tire is substantially elliptical in shape on a horizontal axis. In addition the lower or belly portion 71 of the tire is made substantially flat and the lower sides 72 of the tire 70 are preferably molded to conform to the shape of the inner surface of the beaded edges 14 of the tire casing 10, but in other respects is substantially like the safety tube 60 shown in Fig. 2. With the elliptical shaped tire 70 one size of tire is able to fit several or many sizes of tire casing 10, and it is unnecessary to have as many sizes of safety tube as it would be with the safety tube 60 of Fig. 2, provided the wheel rim 20 is of the same size. The substantially flat belly portion 71 of the tube may have a circumference large enough to slip over the side flange 22b of the wheel rim 20, without using the drop-center 21 of the wheel rim as an aid to installing and removing the tube from the wheel rim.

Figure 5:
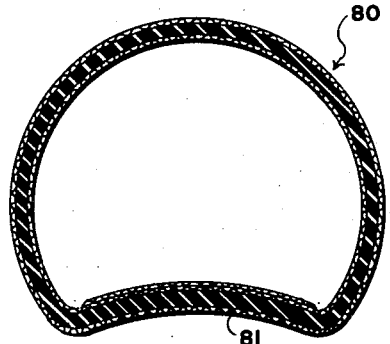
Fig. 5 is a cross-section of a tubeless tire with a second modified form of safety tire.
Figure 6:
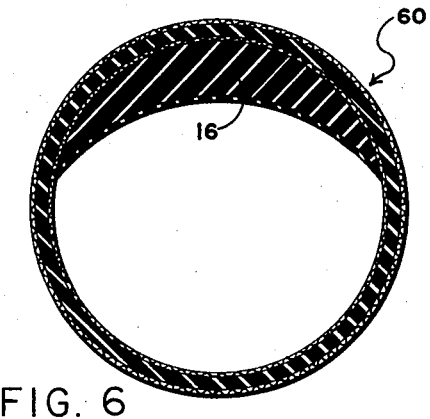
Fig. 6 is a cross-section of a third modified form of safety tire having puncture sealing characteristics.

In Fig. 5 another modification 80 of safety tire is shown wherein the lower or belly portion 81 of the tire is convex in shape in cross-section and curves upwardly toward the center of the tire. The belly portion 81 is preferably stiffened and reinforced with additional layers of cord and rubber to make it less flexible, whereby the air pressure within the tire pressing against the belly portion 81 will cause the latter to flatten out to a certain extent and thus exert greater pressure sidewise against the beaded edges 14 of the tire casing 10. It will be understood, of course, that the stiffened convex belly portion 81 of tire 80 could be added to the tire 70, for instance, if desired. Also in situations where the tire casing 10 is not coated with a lining 16 of self-sealing compound, it is desirable as an additional safety factor to attach such lining or coating 16 of the self-sealing compound to the inside of the safety tire 60, 70 or 80 on the interior under the tread portion, as shown in Fig. 6. In this manner a nail or other object which punctures and deflates the tire casing 10 will be prevented from deflating the safety tube. It may also be desired to use the puncture sealing safety inner tire and a puncture sealing tubeless tire in combination.

Figure 7:
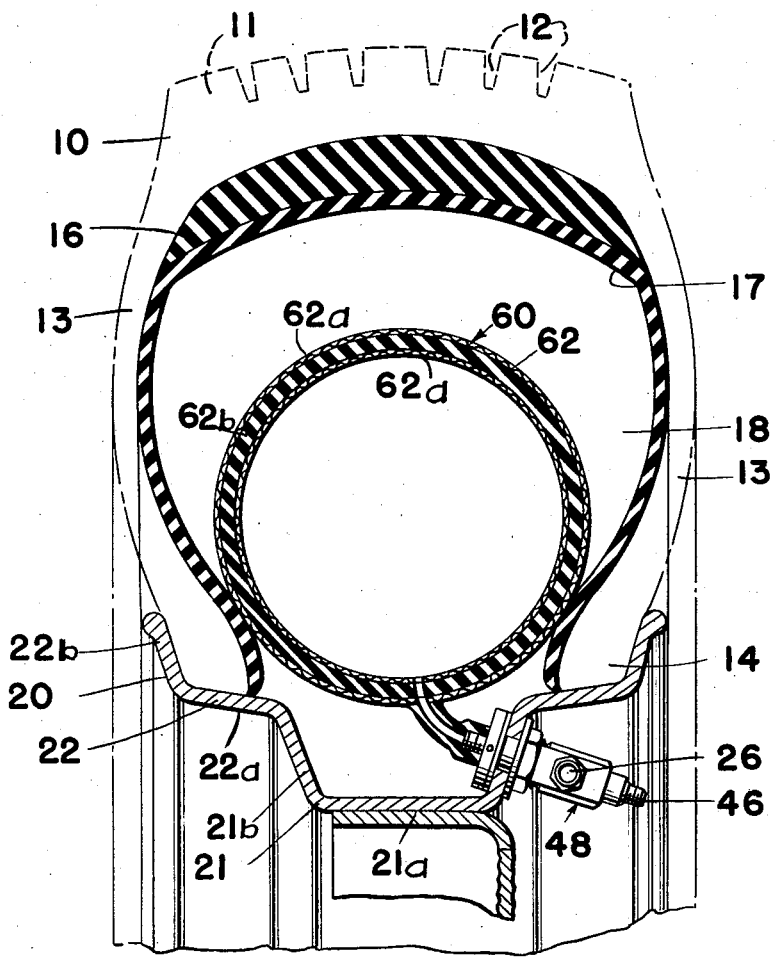
Fig. 7 is a cross-section of a tubeless tire and a safety inner tire combination as mounted on a wheel rim of the drop-center type, showing a single valve structure for inflation purposes.

Fig. 7 discloses the construction shown in Fig. 1 except that both air chambers, the tubeless tire, and the safety inner tire, are separately inflated through a single valve stem as described in my United States Patent 2,608,235 dated August 26, 1952, entitled "Valve Structure for Pneumatic Tires Having Dual Tubes." In Fig. 7 the dual or branching valve is indicated by reference numeral 48. Valve 46 is used to inflate the inner safety tire 60 and valve 26 is used to inflate the tubeless tire. It will be noted that my safety tires 60, 70 or 80 in the event of deflation of tire casing 10 by puncture, blow-out, or other cause, will still act to hold the beaded edges 14 of the tire casing 10 firmly against the angular sides of the rim 20, and will be capable of supporting the load of the vehicle indefinitely and independently, thus avoiding the constant dangers attending tire blow-outs in single chambered tires at high vehicle speeds.

My invention is not limited to the precise constructions shown herein but may be modified in many details, without departure from the spirit of the invention and within the scope of the claims.

It will of course be understood that the term "rubber" as used herein indicates both natural and synthetic rubber and substances having rubber-like properties and characteristics as full equivalents.

I claim:

1. In combination with a tubeless tire casing and a wheel rim having outwardly extending flanged sides forming recesses to receive the beaded edges of the tubeless tire casing, a separate inflatable toroid shaped inner tire, inserted in the tubeless tire casing and provided with a wall portion in contact with the inner surface of the beaded area of said tire casing, said inner tire being smaller when in its inflated condition than the cavity of the tubeless tire, said entire inner tire being formed of a filamentary material and rubber, whereby said inner tire on inflation will press firmly against the inner surfaces of the tubeless tire beads and is enabled on deflection of the tubeless tire to carry the load imposed on it indefinitely, and valve means through which air may be supplied to said inner tire and to the air chamber between the external surface of said inner tire and the interior of the tubeless tire casing and wheel rim.

2. In combination with a tubeless tire casing and a wheel rim having outwardly extending flanged sides forming recesses to receive the beaded edges of the tubeless tire casing, a separate inflatable toroid shaped inner tire inserted in the tubeless tire casing, said inner tire being smaller when in its inflated condition than the cavity of the tubeless tire, said entire inner tire being formed of a filamentary material and rubber, and provided with a substantially flat belly portion which is spaced from said rim and having lower sides thereof conformed to the shape of the inner surface of said beaded edges, whereby said inner tire on inflation presses firmly against the inner surfaces of the tubeless tire beads and is enabled on deflation of the tubeless tire to carry the load imposed on it indefinitely and valve means through which air may be supplied to said inner tire and to the air chamber between the external surface of said inner tire and the interior of the tubeless tire casing and wheel rim.

3. In combination with a tubeless tire casing and a wheel rim having outwardly extending flanged sides forming recesses to receive the beaded edges of the tubeless tire casing, a separate, inflatable toroid shaped inner tire, inserted in and removable from the tubeless tire casing, said inner tire being smaller when in its inflated condition than the cavity of the tubeless tire and formed of a filamentary material and rubber, the belly portion of said inner tire being convex in cross-sectional shape and curved upwardly toward the center of the inner tire, with the convexly shaped portion spaced from said wheel rim, whereby said inner tire on inflation will press firmly against the inner surfaces of the tubeless tire beads, and is enabled on deflation of the tubeless tire to carry the load imposed on it indefinitely, and valve means through which air may be supplied to said inner tire and to the air chamber between the external surface of said inner tire and the interior of the tubeless tire casing and tire wheel rim.

4. In combination with a tubeless tire casing and a wheel rim having outwardly extending flanged sides forming recesses to receive the beaded edges of the tubeless tire casing, a separate and removable inflatable toroid shaped inner tire having a puncture sealing compound embodied or attached to the tread portion, said inner tire inserted in the tubeless tire casing, and being smaller when in its inflated condition than the cavity of the tubeless tire whereby said inner tire on inflation presses firmly against the inner surfaces of the tubeless tire beads, and enables said inner tire on deflection of the tubeless tire to carry the load imposed on it indefinitely, and valve means through which the air may be supplied to said inner tire and to the air chamber between the external surface of said inner tire and the interior of the tubeless tire casing and wheel rim.

References Cited in the file of this patent

UNITED STATES PATENTS

| | | |
|---|---|---|
| 1,459,377 | Peeples | June 19, 1923 |
| 1,653,054 | Mack | Dec. 20, 1927 |
| 2,045,341 | Bourdon | June 23, 1936 |
| 2,554,815 | Church | May 29, 1951 |
| 2,563,787 | Keefe | Aug. 7, 1951 |
| 2,621,700 | Snyder | Dec. 16, 1952 |
| 2,674,291 | Campbell | Apr. 6, 1954 |
| 2,675,846 | Wyman | Apr. 20, 1954 |

FOREIGN PATENTS

| | | |
|---|---|---|
| 7,288 | Great Britain | 1914 |
| 707,078 | France | Apr. 13, 1931 |
| 139,275 | Australia | Nov. 6, 1947 |

UNITED STATES PATENT OFFICE

CERTIFICATE OF CORRECTION

Patent No. 2,861,619                          November 25, 1958

Edwin T. Wyman

It is hereby certified that error appears in the printed specification of the above numbered patent requiring correction and that the said Letters Patent should read as corrected below.

Column 4, lines 17 and 18, and line 72, for "deflection", in each occurrence, read -- deflation --.

Signed and sealed this 7th day of April 1959.

(SEAL)
Attest:

KARL H. AXLINE
Attesting Officer

ROBERT C. WATSON
Commissioner of Patents